(12) United States Patent
Grade et al.

(10) Patent No.: US 9,169,943 B2
(45) Date of Patent: Oct. 27, 2015

(54) VALVE LOCKOUT DEVICE

(75) Inventors: Paul Grade, Port Washington, WI (US); Christopher J. Rohde, West Allis, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 624 days.

(21) Appl. No.: 13/566,131

(22) Filed: Aug. 3, 2012

(65) Prior Publication Data

US 2014/0034153 A1 Feb. 6, 2014

(51) Int. Cl.
*F16K 35/10* (2006.01)

(52) U.S. Cl.
CPC ..................................... *F16K 35/10* (2013.01)

(58) Field of Classification Search
CPC ................................. F16K 35/00; F16K 35/10
USPC ............ 137/385; 251/90, 92, 93; 70/177, 211
See application file for complete search history.

(56) References Cited

U.S. PATENT DOCUMENTS

| | | |
|---|---|---|
| 1,104,022 A | 7/1914 | Tuttle |
| 1,322,721 A | 11/1919 | Noonan |
| 3,914,965 A | 10/1975 | Paxton |
| 3,960,168 A | 6/1976 | Plympton |
| 3,980,099 A | 9/1976 | Youngblood |
| D242,521 S | 11/1976 | Plympton |
| D245,520 S | 8/1977 | Smith et al. |
| 4,126,023 A | 11/1978 | Smith et al. |
| 4,208,893 A | 6/1980 | Avrich et al. |
| 4,304,388 A | 12/1981 | Gates |
| D273,932 S | 5/1984 | Gates |
| 4,498,320 A | 2/1985 | Mullis |
| 4,513,773 A | 4/1985 | Hardiman, Jr. |
| D296,414 S | 6/1988 | DeWalch |
| 4,770,451 A | 9/1988 | Souza |
| 4,971,289 A | 11/1990 | Pietras |
| 5,014,528 A | 5/1991 | Roberts |
| 5,052,655 A | 10/1991 | Ackroyd |
| 5,115,834 A | 5/1992 | Champagne |

(Continued)

FOREIGN PATENT DOCUMENTS

JP 57208380 A 12/1982

OTHER PUBLICATIONS

International Search Report & Written Opinion issued Nov. 11, 2013 for PCT/US2013/052898.

(Continued)

*Primary Examiner* — Eric Keasel
(74) *Attorney, Agent, or Firm* — Quarles & Brady LLP (57) ABSTRACT

A valve lockout device includes a body having a mount portion that defines a passageway. A cover positioned adjacent to the body defines a cover portion adjacent the mount portion thereby inhibiting access to the passageway in the mount portion. A position control arm extends through at least one of the body and cover, the position control arm defines a valve engagement portion and an adjustment portion. A lock aperture is formed in at least the other of the body and cover through which the position control arm extends. An adjustment member is positioned adjacent at least one of the body and the cover, the adjustment member defines an adjustment member aperture aligned with the lock aperture and is configured to engage the adjustment portion of the position control arm. Coupling the lock aperture and the adjustment member aperture inhibits relative movement of the body, cover, and adjustment member.

19 Claims, 4 Drawing Sheets

(56) References Cited

U.S. PATENT DOCUMENTS

| | | | |
|---|---|---|---|
| 5,116,018 A * | 5/1992 | Friemoth et al. | 251/90 |
| 5,165,263 A | 11/1992 | Perron et al. | |
| 5,207,595 A | 5/1993 | Learmont et al. | |
| 5,222,382 A | 6/1993 | De Vizzi | |
| D344,441 S | 2/1994 | Mahaney | |
| 5,299,597 A | 4/1994 | Fort et al. | |
| D348,206 S | 6/1994 | Chen | |
| 5,323,805 A | 6/1994 | Scaramucci | |
| D352,821 S | 11/1994 | Stillwagon | |
| 5,365,759 A | 11/1994 | Bonomi | |
| 5,368,066 A | 11/1994 | Scaramucci | |
| 5,411,048 A | 5/1995 | Massey | |
| 5,415,017 A | 5/1995 | Benda et al. | |
| 5,427,135 A | 6/1995 | Kieper | |
| 5,447,135 A | 9/1995 | Norkus | |
| 5,579,804 A | 12/1996 | Roberts | |
| 5,598,724 A | 2/1997 | Primeau | |
| 5,709,112 A | 1/1998 | Kennedy | |
| 5,806,555 A | 9/1998 | Magno, Jr. | |
| 5,823,027 A | 10/1998 | Glick et al. | |
| D419,054 S | 1/2000 | Curwood | |
| 6,119,494 A | 9/2000 | Whitfield | |
| 6,148,851 A | 11/2000 | Friedline et al. | |
| 6,260,819 B1 | 7/2001 | Ovsepyan | |
| D479,975 S | 9/2003 | Winocoor | |
| 6,622,536 B1 | 9/2003 | Fuller et al. | |
| D487,013 S | 2/2004 | Jenks | |
| 6,959,909 B2 | 11/2005 | Bancroft et al. | |
| 6,981,443 B2 | 1/2006 | Tillaart | |
| 7,044,148 B2 | 5/2006 | Berger et al. | |
| 7,114,698 B2 | 10/2006 | Espinoza | |
| 7,117,884 B2 | 10/2006 | Shuter | |
| D540,151 S | 4/2007 | Ebersole | |
| 7,207,198 B2 | 4/2007 | Benda | |
| 7,500,701 B2 | 3/2009 | Lalancette et al. | |
| 7,581,420 B2 | 9/2009 | Manthe et al. | |
| 7,588,050 B1 | 9/2009 | Russell | |
| D609,551 S | 2/2010 | Gibbs | |
| 7,731,153 B2 | 6/2010 | Miklo et al. | |
| 7,930,913 B2 | 4/2011 | Meyer et al. | |
| D637,891 S | 5/2011 | Chikiri | |
| 7,961,099 B2 | 6/2011 | Rendon et al. | |
| 7,980,201 B2 | 7/2011 | Muelken | |
| D647,781 S | 11/2011 | Tejszerski et al. | |
| D665,244 S | 8/2012 | Weinerman et al. | |
| 2005/0092367 A1 | 5/2005 | Espinoza | |
| 2009/0266119 A1 | 10/2009 | Brojanac et al. | |
| 2010/0108921 A1 | 5/2010 | Milbeck et al. | |

OTHER PUBLICATIONS

English Abstract of JP57208380 (Provided by the European Patent Office).

Brady Worldwide, Inc., Valve Lockout, Website: Home>Products>Lockout Tagout>Valve Lockout, accessed Aug. 3, 2012.

PCT International Preliminary Report on Patentability, PCT/US2013/052898, Feb. 3, 2015.

* cited by examiner

VALVE LOCKOUT DEVICE

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The present invention relates to valve lockout devices, and more particularly to a valve lockout device that is capable of being coupled to a mount and adjusted to accommodate a variety of valve configurations.

Valve lockout devices are used to prevent changing the state of a valve, such as between a closed position and an opened position. For instance, a valve lockout device may be used to lock a valve in a fully closed position while a technician performs repair or maintenance on a component (e.g., a turbine) that is downstream of the locked-out valve. The valve lockout device provides a visual and a structural impediment to altering the state of the valve by, for instance, blocking access to the control handle of a valve or structurally restricting the physical movement of the control handle.

Designing a robust valve lockout device is challenging when the valve lockout device is required to alternately engage and effectively lockout more than one size and/or type of valve. For example, a three inch ball valve having a rectangular bar valve handle establishes distinct design requirements when compared to a six inch butterfly valve having a circular handwheel—a single valve lockout device is unlikely to provide an adequate solution to such unique styles of valves.

In light of at least the above, a need exists for a valve lockout device that is capable of adjusting to and locking out a variety of valve configurations.

SUMMARY OF THE INVENTION

In one aspect, a valve lockout device comprises a body having a mount portion that defines a passageway through the body and a body lock portion that extends from the mount portion and defines a body aperture. A cover positioned adjacent to the body defines a cover portion and a cover lock portion that extends from the cover portion and defines a cover aperture. A position control arm extends through at least one of the body and the cover, the position control arm defines a valve engagement portion and an adjustment portion. An adjustment member is positioned adjacent to at least one of the body and the cover, the adjustment member defines an adjustment member aperture and is configured to engage the adjustment portion of the position control arm. When the body aperture and the cover aperture are aligned, the cover portion is adjacent to the mount portion thereby inhibiting access to the passageway in the mount portion. When the body aperture, the cover aperture, and the adjustment member aperture are aligned, a clasp can be inserted in the body aperture, the cover aperture, and the adjustment member aperture to inhibit relative movement of the body, the cover, and the adjustment member.

In another aspect, a valve lockout device comprises a body having a mount portion that defines a passageway through the body and a body lock portion that extends from the mount portion. A cover positioned adjacent to the body defines a cover portion and a cover lock portion that extends from the cover portion. A position control arm extends through at least one of the body and the cover, the position control arm defines a valve engagement portion and an adjustment portion. A lock aperture is formed in at least the other of the body and the cover through which the position control arm extends. An adjustment member is positioned adjacent to at least one of the body and the cover, the adjustment member defines an adjustment member aperture and is configured to engage the adjustment portion of the position control arm. When the lock aperture and the adjustment member aperture are aligned, the cover portion is adjacent to the mount portion thereby inhibiting access to the passageway in the mount portion, and a clasp can be inserted in the lock aperture and the adjustment member aperture to inhibit relative movement of the body, the cover, and the adjustment member.

In a further aspect, a valve lockout device comprises a body having a mount portion that defines a passageway through the body and a body lock portion that extends from the mount portion and includes a body aperture that is transverse to the passageway. A cover that is slidably coupled to the body defines a cover portion and a cover lock portion that extends from the cover portion. The cover lock portion includes a hole and a cover aperture that is parallel to the body aperture. A position control arm extends through the hole in the cover. The position control arm defines a valve engagement portion and a threaded adjustment portion. An adjustment member is positioned adjacent to at least one of the body and the cover. The adjustment member defines an adjustment member aperture and a threaded portion that is configured to engage the threaded adjustment portion of the position control arm, such that rotation of the adjustment member axially translates the position control arm. When the body aperture and the cover aperture are aligned, the cover portion is adjacent to the mount portion thereby inhibiting access to the passageway in the mount portion. When the body aperture, the cover aperture, and the adjustment member aperture are aligned, a clasp can be inserted in the body aperture, the cover aperture, and the adjustment member aperture to inhibit relative sliding movement of the body and the cover, and rotation of the adjustment member relative to the body and the cover.

In yet another aspect, a valve lockout device comprises a body having a mount portion that defines a passageway through the body. A cover positioned adjacent to the body defines a cover portion adjacent to the mount portion thereby inhibiting access to the passageway in the mount portion. A position control arm extends through at least one of the body and the cover. The position control arm defines a valve engagement portion and an adjustment portion. A lock aperture is formed in at least the other of the body and the cover through which the position control arm extends. An adjustment member is positioned adjacent to at least one of the body and the cover. The adjustment member defines an adjustment member aperture that is aligned with the lock aperture and is configured to engage the adjustment portion of the position control arm. Coupling the lock aperture and the adjustment member aperture inhibits relative movement of the body, the cover, and the adjustment member.

These and still other aspects will be apparent from the description that follows. In the detailed description, preferred example embodiments will be described with reference to the accompanying drawings. These embodiments do not represent the full scope of the concept; rather the concept may be employed in other embodiments. Reference should therefore be made to the claims herein for interpreting the breadth of the invention.

DETAILED DESCRIPTION OF THE PREFERRED EXAMPLE EMBODIMENT

The valve lockout device ("lockout 10") described below and shown in the accompanying figures is illustrative of one example implementation of the inventive concepts; however, when given the benefit of this disclosure, one skilled in the art will appreciate that the inventive concepts described herein can be modified and incorporated into many other applications. For instance, the inventive concepts can be used in conjunction with other devices, such as those described in U.S. provisional application No. 61/543,455 filed on Oct. 5, 2011 and U.S. provisional application No. 61/543,467 filed on Oct. 5, 2011, both of which are hereby incorporated by reference as if fully set forth herein. Furthermore, throughout the description terms such as front, back, side, top, bottom, up, down, upper, lower, inner, outer, above, below, and the like are used to describe the relative arrangement and/or operation of various components of the example embodiment; none of these relative terms are to be construed as limiting the construction or alternative arrangements that are within the scope of the claims.

Figure 1:
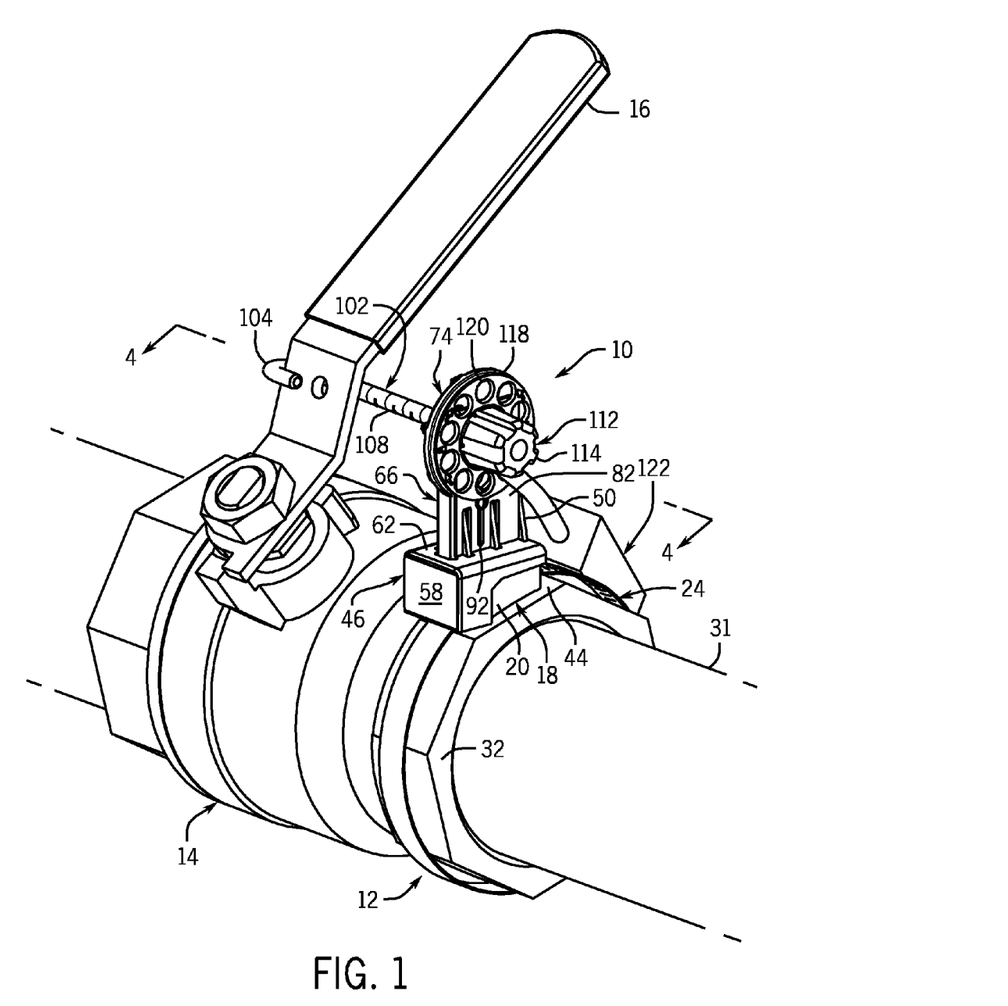
FIG. 1 is an isometric view of an example valve lockout device installed in connection with an example ball valve.
Figure 4:
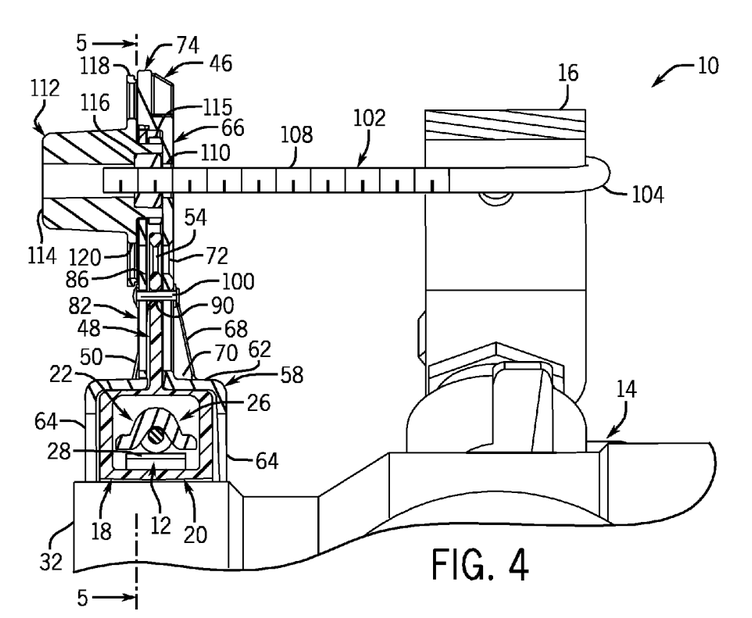
FIG. 4 is a partial section view along line 4-4 shown in FIG. 1.
Figure 5:
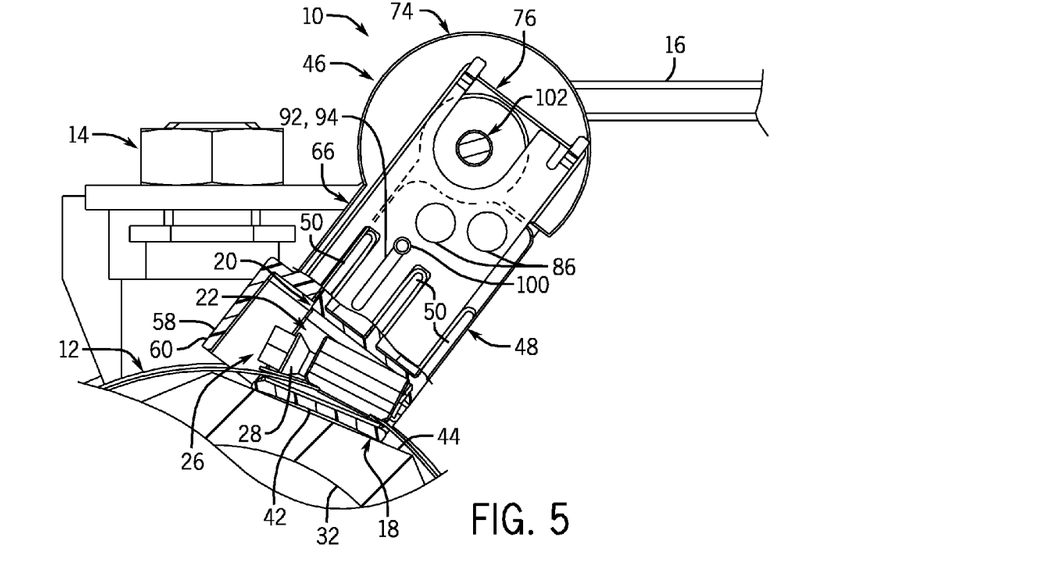
FIG. 5 is a partial section view generally cut away along line 5-5 shown in FIG. 4 with portions of the example valve lockout device removed for clarity.

The example lockout 10 is illustrated in FIGS. 1-6C and is shown in FIGS. 1, 4, and 5 coupled to an example mount 12. The lockout 10 is engaged with a ball valve 14 to restrict movement of a valve handle 16. In general, the lockout 10 is secured to the mount 12 and engages the valve handle 16 to prevent counterclockwise rotation of the valve handle 16 (as viewed in FIG. 1), which would alter the state of the ball valve 14 from the off position (shown in FIG. 1) to the on position.

Figures 2, 3:
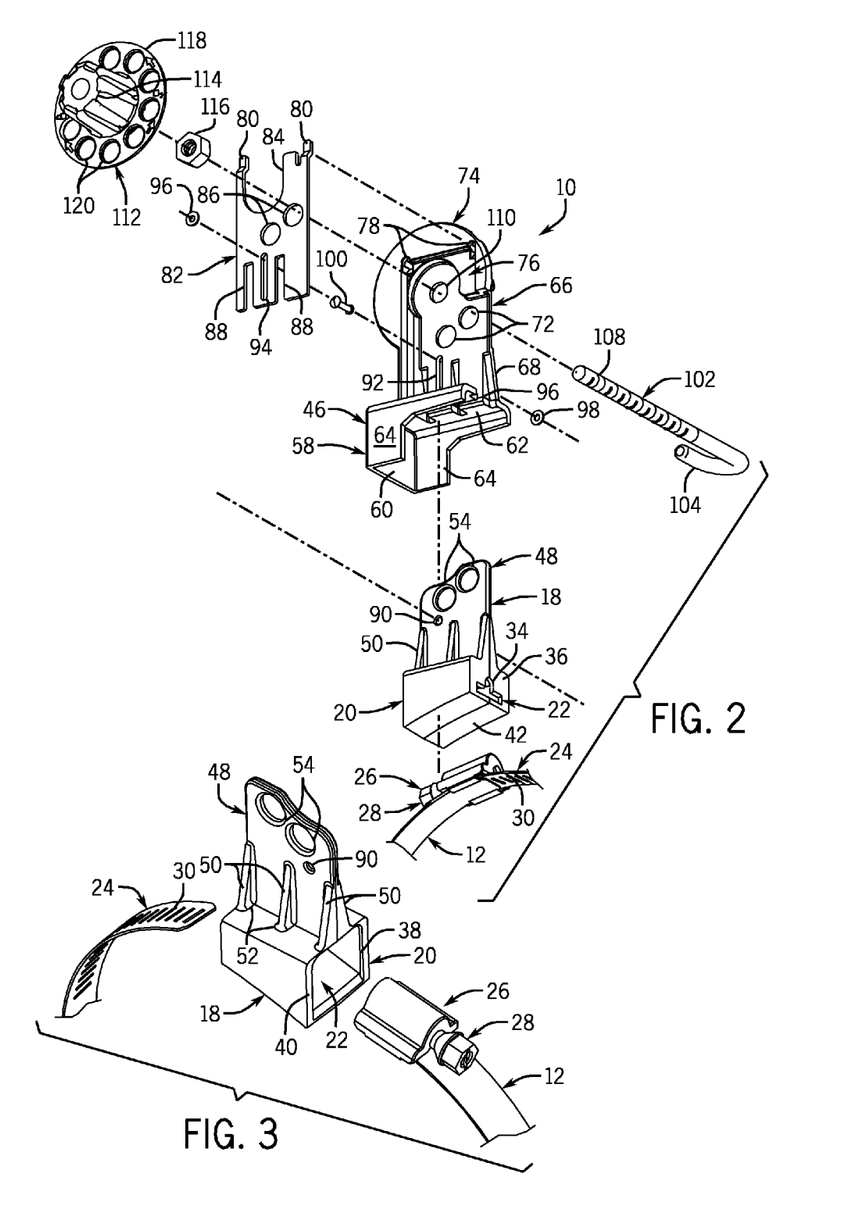
FIG. 2 is an exploded, isometric view of the example valve lockout device and an example mount.
FIG. 3 is an isometric view of an example body uncoupled from the example mount.

With additional reference to FIGS. 2 and 3 the components of the lockout 10 are shown in relation to the example mount 12. The lockout 10 includes a body 18 captured to the mount 12. Specifically, the body 18 has a mount portion 20 defining a passageway 22 through the body 18 that is configured to receive and house a mount adjustment mechanism 26 of the mount 12. In the example embodiment, the mount 12 includes a slotted portion 24 that is engaged by the mount adjustment mechanism 26. In typical fashion, the mount adjustment mechanism 26 includes a worm screw 28 that engages slots 30 in the slotted portion 24. Rotation of the worm screw 28 results in translation of the slotted portion 24 relative to the mount adjustment mechanism 26, which can result in the mount 12 being coupled to a conduit 31 or a collar 32 of the ball valve 14 (shown in FIG. 1). As understood by one of ordinary skill in the art, the mount 12 may comprise a variety of structures, and need not be a circular band. In some forms, the mount 12 may be a valve clamp, a valve band, a mounting pad, or any other structure that can be (or is integrally) secured to a valve or to a conduit, and that includes some form of securement (e.g., a screw-worm gear configuration, a nut-bolt arrangement, a clasp, etc.) that can be housed within the passageway 22 of the body 18 to ultimately prevent removal of the mount 12.

The passageway 22 in the example mount portion 20 of the body 18 is configured to receive the slotted portion 24 and to house the mount adjustment mechanism 26 of the example mount 12. As best shown in FIGS. 2 and 3, the slotted portion 24 is inserted through a keyway 34 formed in an end face 36 of the mount portion 20. Similarly, the mount adjustment mechanism 26 is inserted through a rectangular opening 38 formed in an opposite end face 40 of the mount portion 20. An exterior, inward-facing surface 42 of the mount portion 20 is illustrated as being arcuate to better contour to a curved mounting surface (e.g., the conduit 31), although the surface 42 may be substantially flat to engage a mating flat surface 44 of the collar 32 (e.g., shown in FIG. 5).

Figure 6A:
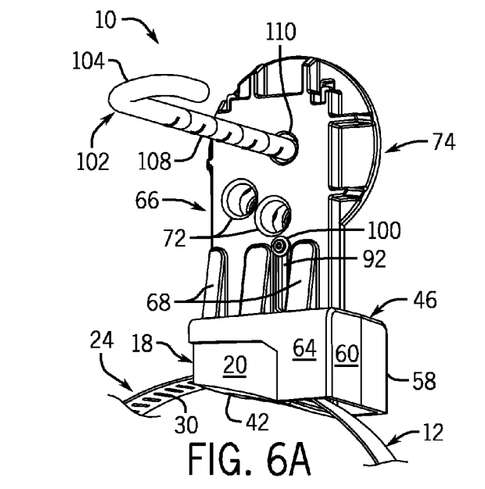
FIG. 6A is a rear isometric view of the example valve lockout device coupled to the example mount.
Figure 6B:
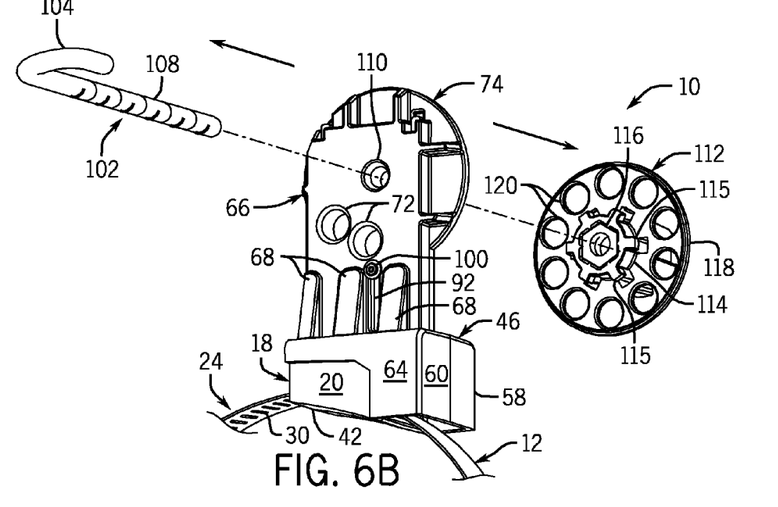
FIG. 6B is a rear isometric view similar to FIG. 6A showing an example position control arm and an example adjustment member uncoupled.
Figure 6C:
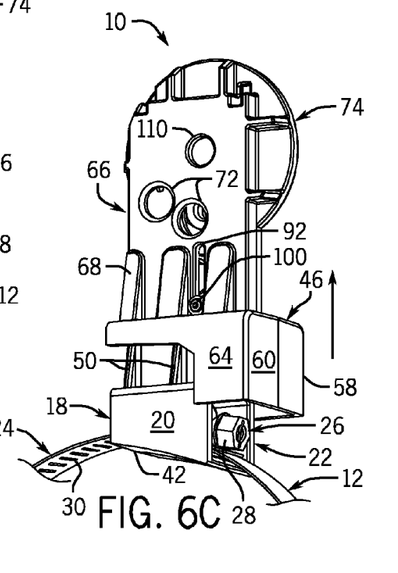
FIG. 6C is a rear isometric view similar to FIG. 6A showing an example cover slid upward relative to the example body.

The body 18 is configured to be slidably coupled with a cover 46 (e.g., in FIG. 6C the cover 46 is shown slid upward from the body 18). The relative movement between the body 18 and the cover 46 allows access to the mount adjustment mechanism 26, which is housed within the passageway 22 of the body 18, to be selectively inhibited by the cover 46 thus preventing tampering with the lockout 10 during use. To facilitate the engagement between the body 18 and the cover 46, the body 18 includes a body lock portion 48 that extends upward from the mount portion 20. A series of positioning ribs 50 are generally perpendicular to the plane of the body lock portion 48 and taper into the body lock portion 48 from a base 52 formed in the mount portion 20. A pair of body apertures 54 are formed through the body lock portion 48 and are positioned such that centers of the body apertures 54 are circumferentially spaced along an imaginary circle, that is, the centers of the body apertures 54 are substantially equal distance from a common center point. The body apertures 54 are oriented generally transverse to the longitudinal axis of the passageway 22. The body lock portion 48 further defines an arcuate upper end 56 that also has a radius of curvature emanating from the same common center point as the body apertures 54.

With continued reference to FIG. 2 and additional reference to FIGS. 4 and 5, the mount 12 is secured to the collar 32 such that the mount adjustment mechanism 26 is housed within the passageway 22 formed in the body 18. The cover 46 is positioned adjacent to and slid downward over the body 18 to inhibit access to the mount adjustment mechanism 26, thus inhibiting operational access to the mount adjustment mechanism 26 and removal of the body 18. Specifically, the cover 46 defines a cover portion 58 that partially blocks access to the rectangular opening 38 formed in the mount portion 20 of the body 18. The cover portion 58 is sized to prevent easy access to the worm screw 28 within the passageway 22, which inhibits loosening and removal of the mount 12. The cover portion 58 includes an end wall 60 bridging a top wall 62 and side walls 64. A cover lock portion 66 extends upward from the cover portion 58 and includes a series of strengthening ribs 68 that are generally perpendicular to the plane of the cover lock portion 66 and that taper into the cover lock portion 66 from a base 70 formed with the top wall 62 of the cover portion 58. The strengthening ribs 68 are also sized to accommodate several of the positioning ribs 50 when the cover 46 is slid onto the body 18. A pair of cover apertures 72 are formed through the cover lock portion 66 and are positioned such that centers of the cover apertures 72 are circumferentially spaced along an imaginary circle, that is, the centers of the cover apertures 72 are substantially equal distance from a common center point. The imaginary circle of the cover apertures 72 is coaxial with the imaginary circle of the body apertures 54 when the cover 46 is fully seated onto the body 18, such that the body apertures 54 are coaxial with the respective cover apertures 72. Furthermore, in the example embodiment, the cover apertures 72 and the body apertures 54 are generally formed in parallel offset planes.

The cover lock portion 66 also includes a disc-shaped portion 74 and a rectangular recess 76 intersecting the disc-shaped portion 74. The upper corners of the recess 76 define pockets 78 into which mating bent tabs 80 of a plate 82 are positioned. The form factor of the recess 76 is configured to generally match the outer envelope of the plate 82, such that the plate 82 is securely seated into the recess 76. The plate 82 further includes a U-shaped cutout 84 and a pair of plate apertures 86 that are aligned with the cover apertures 72. Parallel notches 88 are formed in the plate 82 to provide clearance for the positioning ribs 50 of the body 18. The plate 82 is inserted into the recess 76 to provide additional robustness and resistance to tampering with the lockout 10. However, in some applications, the plate 82 may not be necessary or may be integral with the cover 46 (e.g., by overmolding a cover to a metallic plate).

When assembled, the cover 46 and the plate 82 can be slid relative to the body 18. Specifically, the body 18 includes a rivet opening 90 formed through the body lock portion 48, the cover 46 includes a vertical slot 92 formed in the cover lock portion 66, and the plate 82 includes another vertical slot 94. The body lock portion 48 is inserted into a groove 96 in the top wall 62 of the cover lock portion 66 as the cover 46 is slid over the body 18. When the cover 46 is fully seated on the body 18, the vertical slots 92, 94 of the cover 46 and the plate 82, respectively, flank the rivet opening 90. A pair of washers 98 and a rivet 100 are then secured in the vertical slots 92, 94 and the rivet opening 90 to slidably capture the cover 46 and the plate 82 to the body 18. Once coupled, the cover 46 and the plate 82 can be moved up and down vertically relative to the body 18 as the rivet 100 rides in the slots 92, 94 between ends of the slots 92, 94.

With the body 18, the cover 46, and the plate 82 secured to the mount 12, a position control arm 102 can be engaged with the valve handle 16 and coupled to the balance of the lockout 10. Specifically, the example position control arm 102 includes a curved, U-shaped valve engagement portion 104 that is configured to securely capture the valve handle 16. Given the benefit of this disclosure, one skilled in the art will appreciate the various valve engagement portion configurations that are suitable to engage and restrain a valve handle. For example, in other forms, a valve engagement portion may completely cover or encapsulate a valve handle. An opposite end of the position control arm 102 defines an adjustment portion 108, which is threaded in the example embodiment. The adjustment portion 108 is inserted through a hole 110 formed in the cover lock portion 66 of the cover 46, extends adjacent to the arcuate upper end 56 of the body 18, and through the U-shaped cutout 84 in the plate 82. While the position control arm 102 is shown as engaging the cover 46, the position control arm 102 may alternatively engage the body 18 or the plate 82, or some combination of the body 18, the cover 46, and the plate 82.

The relative location of the position control arm 102 is controlled by an adjustment member 112. The adjustment member 112 is positioned adjacent to the plate 82 and the disc-shaped portion 74 of the cover lock portion 66. The adjustment member 112 includes a central barrel 114 into which a nut 116 is secured (e.g., press-fit), such that the nut 116 rotates in unison with the adjustment member 112. A series of circumferentially spaced fingers 115 extend radially outward from the central barrel 114 (best shown in FIGS. 4 and 6B) to axially capture the adjustment member 112 to the plate 82, such that the barrel 114 bears against the U-shaped cutout 84 during relative rotation of the adjustment member 112. A radial flange 118 extends from the central barrel 114 and defines a series of circumferentially-spaced adjustment member apertures 120. In use, the threaded adjustment portion 108 is engaged with the nut 116 of the adjustment member 112 such that rotating the adjustment member 112 rotates the nested nut 116, thereby axially translating the position control arm 102 toward and away from the cover 46 depending on the rotational direction of the adjustment member 112. As the position control arm 102 translates toward the cover 46, the valve engagement portion 104 will abut and restrain movement of the valve handle 16 (e.g., as shown in FIGS. 1 and 4). Given the benefit of this disclosure, one skilled in the art will appreciate that alternative forms of restrained engagement between the position control arm 102 and the adjustment member 112 are possible. For instance, the engagement may incorporate a series of axially spaced ramps on a position control arm that engage a hinged pawl within an adjustment member, such that when the pawl is aligned with the successive of ramps, the position control arm can only be translated toward the body adjustment member. Rotating the adjustment member will offset the pawl and the ramps such that the position control arm can be removed from the adjustment member.

In the example embodiment, the lockout 10 is engaged with the valve handle 16 by first sliding the cover 46 downward over the body 18 to align the cover apertures 72 and the plate apertures 86 with the body apertures 54. The adjustment member 112 is rotated to securely engage the position control arm 102 with the valve handle 16 while simultaneously aligning at least one of the adjustment member apertures 120 with the aligned plate apertures 86, the body apertures 54, and the cover apertures 72. A clasp 122 (shown in FIG. 1) is then inserted into at least one aperture in the cover 46, the plate 82, the body 18, and the adjustment member 112 to prevent relative rotational movement of the adjustment member 112, which, if allowed, would uncouple the valve engagement portion 104 and the valve handle 16. The clasp 122 engagement also prevents relative sliding between the body 18, the cover 46, and the plate 82, which inhibits access to the mount adjustment mechanism 26 that is secured beneath the cover portion 58 of the cover 46 and within the passageway 22 of the body 18. The clasp 122 can comprise various devices, such as a straight bar, a keyed pad lock, a shackle, a plastic cable tie, and the like, but is preferably sized to prevent any substantial relative movement between the various components of the lockout 10.

With specific reference to FIGS. 6A-6C (showing only the lockout 10), the lockout 10 is uninstalled by first removing the clasp 122, which allows the adjustment member 112 to be rotated. Rotating the adjustment member 112 in the opposite direction as that used to draw the valve engagement portion 104 of the position control arm 102 toward the cover 46 will result in translating the valve engagement portion 104 axially away from the valve handle 16. In the example embodiment, the position control arm 102 and the adjustment member 112 need not be completely disconnected in order for the cover 46 and the plate 82 to be slid upward away from the mount portion 20 of the body 18 (e.g., shown in FIG. 6C). With the cover portion 58 spaced from the passageway 22, the mount adjustment mechanism 26 within the passageway 22 can be accessed to disengage the mount 12 from the body 18 (e.g., see FIG. 3).

In other forms, the lockout 10 can include a single lock aperture (e.g., the body aperture 54 or the cover aperture 72) that is formed in the component (e.g., the body 18 or the cover 46) that does not define the opening (e.g., hole 110) through which the position control arm 102 is inserted. In other words, as long as the position control arm 102 engages the adjustment member 112 and at least one of the body 18 and the cover 46 (e.g., intersects the path that the cover 46 must traverse to slide away from the body 18 or extends through an opening in the cover 46 or the body 18), the clasp 122 can be used to couple the adjustment member 112 to the other of the cover 46 and the body 18, effectively linking the components to prevent relative movement.

The body 18, the cover 46, the plate 82, the position control arm 102, and the adjustment member 112 can be made of plastic, metal, composites, or any other suitable material to accommodate the particular application requirements. In preferred forms, the body 18 and the cover 46 are made of plastic, while the plate 82 and the position control arm 102 are made of metal, such as steel.

While there has been shown and described what is at present considered the preferred embodiments, it will be appreciated by those skilled in the art that various changes and modifications can be made without departing from the scope of the invention defined by the following claims (e.g., the relative proportions and dimension of the components can be altered, and, where applicable, various components can be integrally formed or single components can be separated into multiple pieces).

We claim:

1. A valve lockout device comprising:
    a body having a mount portion that defines a passageway through the body and a body lock portion that extends from the mount portion and defines multiple body apertures;
    a cover positioned adjacent to the body that defines a cover portion and a cover lock portion that extends from the cover portion and defines multiple cover apertures;
    a position control arm that extends through at least one of the body and the cover, the position control arm defines a valve engagement portion and an adjustment portion; and
    an adjustment member positioned adjacent to at least one of the body and the cover, the adjustment member defines an adjustment member aperture and is configured to engage the adjustment portion of the position control arm;
    wherein when a body aperture of the multiple body apertures and a cover aperture of the multiple cover apertures are aligned, the cover portion is adjacent to the mount portion thereby inhibiting access to the passageway in the mount portion;
    wherein when the body aperture, the cover aperture, and the adjustment member aperture are aligned, a clasp inserted in the body aperture, the cover aperture, and the adjustment member aperture inhibits relative movement of the body, the cover, and the adjustment member; and
    wherein the multiple body apertures and the multiple cover apertures are equal distance from a common center point.

2. The valve lockout device of claim 1 wherein the body aperture is transverse to the passageway.

3. The valve lockout device of claim 2 wherein the cover aperture and the body aperture are formed in parallel offset planes.

4. The valve lockout device of claim 1 wherein the cover is slidably coupled to the body.

5. The valve lockout device of claim 1 wherein:
    the cover lock portion includes a hole;
    the position control arm extends through the hole in the cover and the adjustment portion is threaded; and
    the adjustment member defines a threaded portion that is configured to engage the threaded adjustment portion of the position control arm such that rotation of the adjustment member axially translates the position control arm.

6. The valve lockout device of claim 1 further comprising a plate positioned between the cover and the adjustment member.

7. The valve lockout device of claim 1 wherein the adjustment member aperture includes multiple adjustment member apertures that are equal distance from the common center point.

8. The valve lockout device of claim 1 wherein the valve engagement portion is U-shaped.

9. A valve lockout device comprising:
    a body having a mount portion that defines a passageway through the body and a body lock portion that extends from the mount portion;
    a cover positioned adjacent to the body that defines a cover portion and a cover lock portion that extends from the cover portion;
    a position control arm that extends through at least one of the body and the cover, the position control arm defines a valve engagement portion and an adjustment portion;
    multiple lock apertures formed in at least the other of the body and the cover through which the position control arm extends; and
    an adjustment member positioned adjacent to at least one of the body and the cover, the adjustment member defines multiple adjustment member apertures and is configured to engage the adjustment portion of the position control arm;
    wherein when a lock aperture of the multiple lock apertures and an adjustment member aperture of the multiple adjustment apertures are aligned, the cover portion is adjacent to the mount portion thereby inhibiting access to the passageway in the mount portion, and a clasp inserted in the lock aperture and the adjustment member aperture inhibits relative movement of the body, the cover, and the adjustment member; and
    wherein the multiple lock apertures and the multiple adjustment apertures are equal distance from a common center point.

10. The valve lockout device of claim 9 wherein:
    the position control arm extends through the cover; and
    the lock aperture is formed in the body.

11. The valve lockout device of claim 9 wherein the lock aperture is transverse to the passageway.

12. The valve lockout device of claim 9 wherein the cover is slidably coupled to the body.

13. The valve lockout device of claim 9 wherein:
    the cover lock portion includes a hole;
    the position control arm extends through the hole and the adjustment portion is threaded; and
    the adjustment member defines a threaded portion that is configured to engage the adjustment portion of the position control arm such that rotation of the adjustment member axially translates the position control arm.

14. The valve lockout device of claim 9 further comprising a plate positioned between the cover and the adjustment member.

15. The valve lockout device of claim 9 wherein:
the multiple lock apertures include multiple body apertures formed in the body lock portion and multiple cover apertures formed in the cover lock portion;
the multiple body apertures and the multiple cover apertures are equal distance from the common center point.

16. A valve lockout device comprising:
a body having a mount portion that defines a passageway through the body;
a cover positioned adjacent to the body that defines a cover portion adjacent to the mount portion thereby inhibiting access to the passageway in the mount portion;
a position control arm that extends through at least one of the body and the cover, the position control arm defines a valve engagement portion and an adjustment portion;
multiple lock apertures formed in at least the other of the body and the cover through which the position control arm extends; and
an adjustment member positioned adjacent to at least one of the body and the cover, the adjustment member defines multiple adjustment member apertures including an adjustment member aperture aligned with a lock aperture of the multiple lock apertures and is configured to engage the adjustment portion of the position control arm;
wherein coupling the lock aperture and the adjustment member aperture inhibits relative movement of the body, the cover, and the adjustment member; and
wherein the multiple lock apertures and the multiple adjustment member apertures are equal distance from a common center point.

17. The valve lockout device of claim 16 wherein the cover is slidably coupled to the body.

18. The valve lockout device of claim 16 wherein:
the cover includes a hole;
the position control arm extends through the hole and the adjustment portion is threaded; and
the adjustment member defines a threaded portion that is configured to engage the adjustment portion of the position control arm such that rotation of the adjustment member axially translates the position control arm.

19. The valve lockout device of claim 16 wherein:
the multiple lock apertures include multiple body apertures formed in the body and multiple cover apertures formed in the cover;
the multiple body apertures and the multiple cover apertures are equal distance from the common center point.

\* \* \* \* \*